United States Patent [19]
Haupt et al.

[11] Patent Number: 5,692,262
[45] Date of Patent: Dec. 2, 1997

[54] MULCHING IMPELLER FOR LAWN AND GARDEN MULCHING BLOWER-VACUUM

[76] Inventors: David J. Haupt, 9891 Hidden Branch La., Shreveport, La. 71118; Michael D. Marcade, 524 Sophia La., Shreveport, La. 71115

[21] Appl. No.: 769,632

[22] Filed: Dec. 18, 1996

Related U.S. Application Data

[63] Continuation of Ser. No. 589,597, Jan. 22, 1996, abandoned.

[51] Int. Cl.⁶ ................................................. B02C 18/06
[52] U.S. Cl. ........................... 15/339; 15/344; 241/55; 415/121.1
[58] Field of Search ................ 15/344, 339; 415/121.1; 241/55

[56] References Cited

U.S. PATENT DOCUMENTS

| | | |
|---|---|---|
| Re. 33,050 | 9/1989 | Tuggle et al. . |
| 2,340,457 | 2/1944 | Dion ............................ 241/55 |
| 3,608,838 | 9/1971 | Lundin . |
| 3,712,353 | 1/1973 | Ferry . |
| 3,917,176 | 11/1975 | Carlsmith ....................... 241/55 |
| 3,968,938 | 7/1976 | Ruhl et al. ................... 15/339 X |
| 3,986,676 | 10/1976 | Husmann . |
| 4,074,869 | 2/1978 | Johnson . |
| 4,076,460 | 2/1978 | Roof . |
| 4,117,983 | 10/1978 | Browning . |
| 4,121,405 | 10/1978 | Wolf . |
| 4,288,886 | 9/1981 | Siegler . |
| 4,325,163 | 4/1982 | Mattson et al. .............. 15/339 X |
| 4,430,214 | 2/1984 | Baker . |
| 4,527,380 | 7/1985 | Fushiya et al. . |
| 4,644,606 | 2/1987 | Luerken et al. . |
| 4,694,528 | 9/1987 | Comer et al. . |
| 4,746,274 | 5/1988 | Kiyooka et al. . |
| 4,904,159 | 2/1990 | Wickoren ................. 415/121.1 X |
| 5,085,375 | 2/1992 | Haworth . |
| 5,240,189 | 8/1993 | Majkrzak et al. . |
| 5,245,726 | 9/1993 | Rote et al. .............. 415/121.1 X |
| 5,358,189 | 10/1994 | Vandermolen . |
| 5,511,281 | 4/1996 | Webster ..................... 241/55 X |

FOREIGN PATENT DOCUMENTS

| | | | |
|---|---|---|---|
| 561238 | 8/1958 | Canada ......................... 415/121.1 |
| 41904 | 3/1977 | Japan .......................... 415/121.1 |

*Primary Examiner*—Chris K. Moore
*Attorney, Agent, or Firm*—Marc A. Hubbard

[57] ABSTRACT

A centrifugal impeller for a hand-held leaf blower-vacuum apparatus includes a central hub for mounting to the drive shaft of the leaf blower-vacuum motor and a plurality of serrated vanes for shredding drawn-in lawn debris and ejecting the shredded debris from the leaf blower-vacuum apparatus. The serrated vanes have a plurality of sharp corners on the leading edges of the vanes on which the drawn-in debris is incident. The sharp corners reduce the debris more rapidly and to a smaller size, thereby preventing the jamming of the impeller by an overload of debris.

21 Claims, 1 Drawing Sheet

5,692,262

MULCHING IMPELLER FOR LAWN AND GARDEN MULCHING BLOWER-VACUUM

This application is a continuation of application Ser. No. 08/589,597 filed Jan. 27, 1996 now abandoned.

TECHNICAL FIELD OF THE INVENTION

The present invention relates to lawn and garden equipment and, in particular, to portable hand-held vacuums for collecting and mulching lawn debris.

BACKGROUND OF THE INVENTION

Convertible hand-held leaf blower-vacuum machines are dual-mode devices capable of blowing or vacuuming leaves, branches, grass clippings, and other loose debris from lawns, walkways, patios, driveways, and sidewalks. Most hand-held leaf blower-vacuum machines use a high-speed centrifugal fan, or impeller, to vacuum or blow the leaves and other debris. The impeller has a plurality of vanes mounted thereon and is rotated at high speed by an electric motor or internal combustion engine. The rotation of the impeller generates a rapidly moving stream of air that creates a powerful suction at an inlet opening of a fan housing and a high-velocity stream of air exiting from an outlet opening of the fan housing. When used in blower mode, a cover is placed over the air inlet to prevent ingestion of debris and the high velocity air stream is used to sweep lawn debris. When used in vacuum mode, the cover is rotated away from the air inlet area and an elongated tube placed over the air inlet. Lawn debris can be entrained in the air drawn in through the tube, passes through the housing, and is ejected through the outlet opening into a bag or other debris collection means.

Generally, the vanes of the impeller break incoming debris into pieces small enough to fit between the impeller vanes. It is desirable to reduce debris to small pieces because small pieces occupy less volume and allow the bag to be emptied less often. However, the impeller tends not to be an efficient means for mulching or breaking up debris into small pieces. Large pieces of debris, such as pine cones, do not disintegrate rapidly, thereby creating obstacles which reduce air flow and which may cause partial or total occlusion of the opening.

Leaf blower-vacuum machines powered by internal combustion engines have been outfitted with special steel blades attached to the impeller to better mulch small and large debris. However, leaf blower-vacuum machines are often powered by electric motors due to considerations of weight, expense and customer preference. Steel blades tend to be relatively heavy and thus tend to impose too great a load on the relatively small, lightweight electric motors preferred for hand-held leaf blower-vacuums. When debris strikes and slows down the impeller blades, recovery of impeller speed is slowed by the inertia of the steel blades, thus degrading performance.

SUMMARY OF THE INVENTION

The invention provides for an improved impeller for a hand-held leaf blower-vacuum machine which shreds lawn debris smaller and more rapidly in order to improve the mulching performance of the blower-vacuum apparatus without adding weight to the impeller.

According to the invention, a centrifugal impeller adapted for mounting to the drive shaft of a blower-vacuum apparatus comprises a central hub for mounting the impeller to the drive shaft and a plurality of vanes coupled to the central hub for shredding debris drawn into the blower-vacuum apparatus and ejecting the shredded debris from the blower-vacuum apparatus. At least one of the plurality of vanes has a plurality of notches cut or molded in a leading edge for forming at least one corner or point for more efficiently tearing or shredding drawn-in debris incident on the impeller.

The foregoing is intended to briefly describe certain features and technical advantages of the invention and its preferred embodiment described below. It is not intended to limit in any way the scope of the invention as set forth in the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
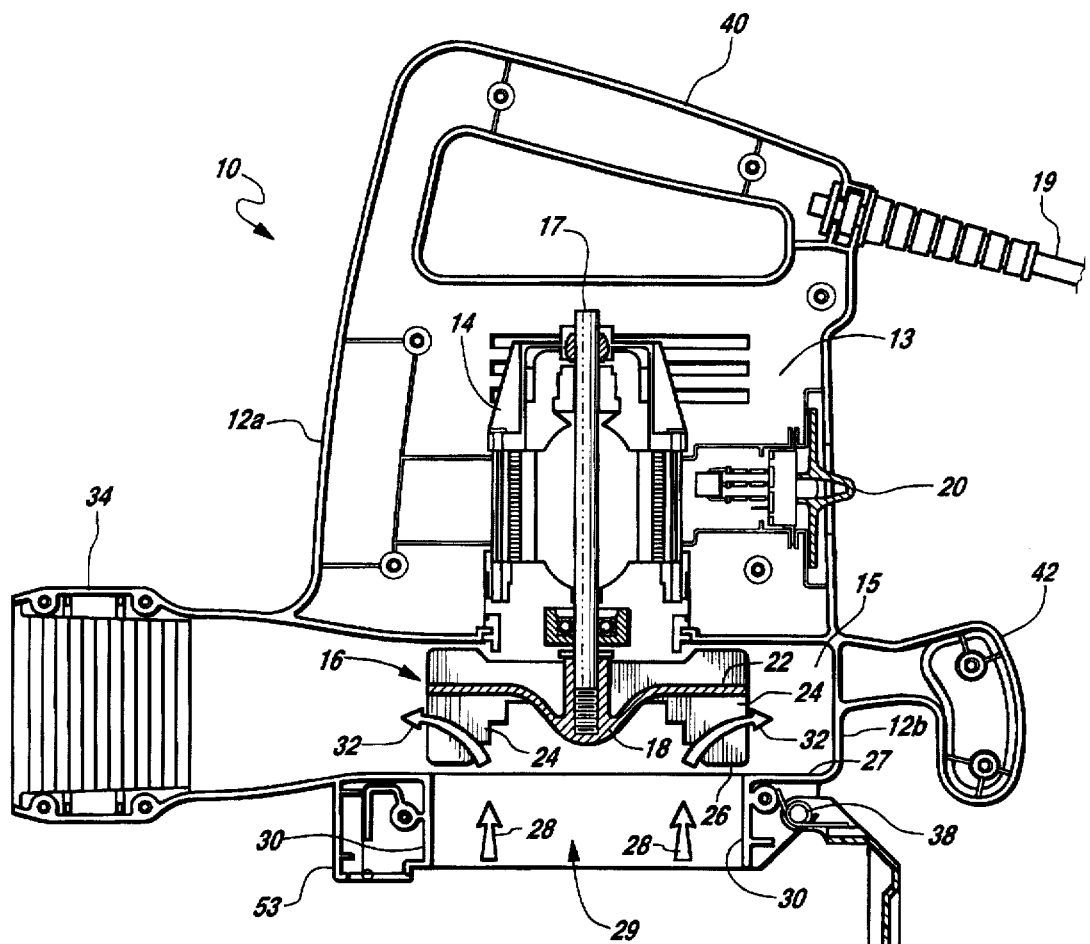
FIG. 1 is a partial cross-sectional view of a blower-vacuum apparatus having an improved impeller blade for shredding and propelling leaf and lawn debris in accordance with the present invention.

Reference FIG. 1 is a partial cross-sectional view of a blower-vacuum 10, which is intended to represent a conventional electrically powered leaf blower-vacuum machine. However, unlike a conventional leaf blower-vacuum, it includes an improved impeller 16 in accordance with the present invention. Blower-vacuum 10 includes integrated housing 12 having upper housing section 12a for encasing electric motor 14 and lower housing section 12b for forming a fan volute. Electric motor 14 rotates drive shaft 17 at high speed. Electric motor 14 receives power from cord 19. Switch 20 is used to turn electric motor 14 on and off. Electric motor 14 could be replaced by an internal combustion engine, if desired, although improved impeller 16 is used to particular advantage on an electrically powered blower-vacuum machine.

Disposed on top of housing 12a is carrying handle 40, which enables a user to comfortably carry portable blower-vacuum 10 at an elevated position above the ground when blowing or vacuuming debris. In addition to carrying handle 40, rear handle 42 is provided on housing 12 in order to more comfortably hold the unit when used in vacuum mode. Drive shaft 17 extends through the wall separating upper housing section 12a and lower housing section 12b. Impeller 16 is mounted on the end of drive shaft 17 disposed within lower housing 12b.

Figure 2:
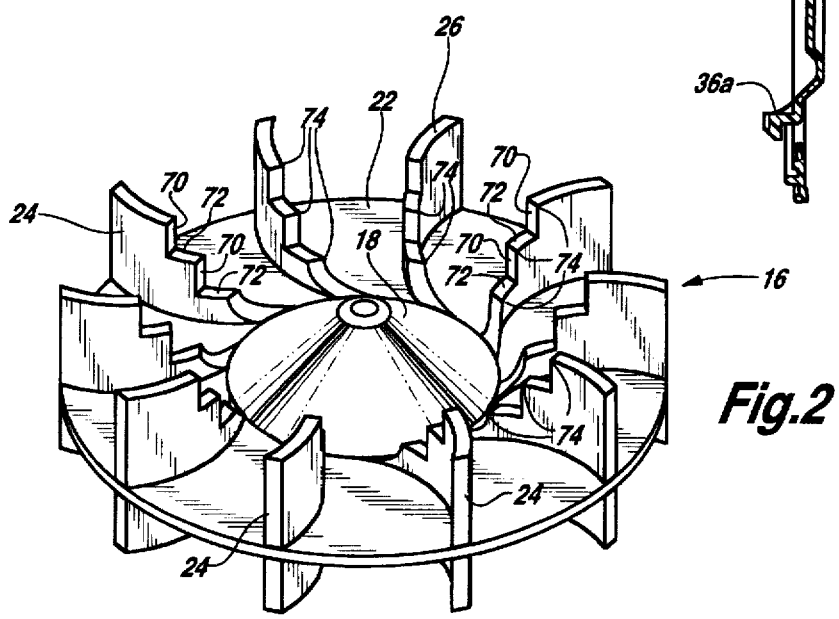
FIG. 2 is a perspective view of an improved impeller blade in accordance with the present invention.

As can be seen in FIGS. 1 and 2, impeller 16 is a centrifugal fan comprised of central hub 18, circular mounting plate 22 and a plurality of vanes 24 mounted on plate 22. Hub 18 is used to mount impeller 16 on drive shaft 17. Debris that is incident on the center of hub 18 is deflected outward toward vanes 24 by the dome shape and the rotation of hub 18. Chamber 15 defined by the walls of lower housing section 12b is shaped like a conventional fan volute for a centrifugal impeller. Impeller 16 is positioned close to, and axially aligned with, circular inlet opening 29, defined in the bottom wall of lower housing 12b. Any debris drawn into inlet opening 29 strikes impeller 16.

The rotation of impeller 16 by drive shaft 17 creates an air flow, indicated by arrows 28, that is drawn into lower housing section 12b through inlet opening 29. The drawn-in air then flows radially outward into chamber 15. The volute shape of the lower housing section 12b directs the air into a stream which exits through an outlet opening defined by coupling sleeve 34. Coupling sleeve 34 enables connection of a concentration tube for operating the unit in blower mode. During operation in vacuum mode, a bag is hung on coupling sleeve 34 for collecting debris ejected through the outlet opening.

Cover 36 is mounted by hinge 38 to lower housing section 12b. When blower-vacuum 10 is used in blower mode, cover 36 is swung toward lower housing section 12b in order to cover inlet 29. Hook 36a on cover 36 engages latch spring 53 in order to lock cover 36 into place. A plurality of holes in cover 36 allows air to be freely drawn through cover 36 into inlet 29 during blower-mode operation while blocking larger debris from being ingested.

During vacuum mode operation, an elongated cylindrical vacuum tube (not shown) is mounted within side walls 30 of inlet 29, thereby effectively extending the inlet opening of the vacuum downward, so that a user may stand without stooping while vacuuming debris from the ground. In vacuum mode, debris is entrained in the air drawn into chamber 15 within lower housing 12b, whereupon it strikes impeller 16. If small enough to fit between vanes 24, the debris will eventually be carried by the air flow through impeller 16 into chamber 15 and through the outlet opening.

Debris will tend naturally to break when struck by the rapidly rotating vanes 24. However, if solid debris, such as branches and pine cones, or large clumps of heavy debris, such as wet grass clippings, are drawn into vanes 24 of impeller 16, the debris may slow down or even stall the rotation of impeller 16. To improve the ability of impeller 16 to tear, shred, cut, macerate or otherwise break apart incoming debris into smaller fragments, a plurality of notches forming vertical flat surfaces 70 and horizontal flat surfaces 72 are cut along the inward edges of vanes 24. These serration-like edges tend to be the first surfaces of vanes 24 that most of the incoming debris strikes. The serrated edges of vanes 24 provide a plurality of sharply defined corner points 74 which tend to tear into or break apart impinging debris, thus mulching lawn debris into smaller pieces more rapidly than smooth-edged vanes, particularly debris such as pine cones and other woody objects. Since incoming debris is reduced to smaller sizes more rapidly, it is less likely to cause occlusions in the inlet opening. Furthermore, the resulting mulch is finer, occupying less volume in the collection bag. Thus, the collection bag requires emptying less frequently.

Preferably, corner points 74 are oriented in the direction of incoming debris, which is both inward, towards hub 18, and toward air inlet opening 29, away from impeller 16. Incoming debris will therefore tend to meet the sharp corner points 74 head-on, with greater impact and without glancing any other surface which would tend to reduce the force with which corner points 74 contact the debris. If the debris is relatively large, the orientation of corner points 74 will tend to kick the debris back toward air inlet opening 29 and into the incoming air stream. The air stream will then carry the debris back toward impeller 16, where the debris will again strike corner points 74 of impeller 16. The result is that the debris repeatedly encounters corner points 74 until it sufficiently shredded, with reduced possibility of wedging into or blocking impeller 16.

Furthermore, the planes of vertical surface 70 and horizontal surface 72 of each notch are oriented to further define or sharpen the corner points 74 in the direction of rotation of the impeller, thereby providing more direct contact with the incoming debris. This improves the ability of impeller 16 to break apart or cut incoming debris. Finally, the number and spacing of corner points 74 on the inner edge of each vane 24 are chosen to optimize tearing and breaking performance without substantially interfering with the efficiency of the impeller. For example, by spacing apart the corner points, the force with which they hit a larger object will be more concentrated. However, greater distances between the corner points may tend to reduce the amount of tearing action, especially on softer debris, and results in less mulching of smaller objects. On the other hand, narrowing the spacing to increase the number of corner points will tend to result in less concentrated force being applied to larger and tougher objects, thus reducing mulching performance for these objects.

Although the present invention and its advantages have been described in detail, it should be understood that various changes, substitutions and alterations can be made herein without departing from the spirit and scope of the invention as defined by the appended claims.

What is claimed is:

1. A centrifugal impeller adapted for mounting to a drive shaft of a blower-vacuum apparatus comprising:

a central hub for mounting the impeller to the drive shaft; and a plurality of vanes coupled to the central hub, the plurality of vanes creating, when the impeller is disposed within a housing, a flow of air toward the hub and then radially outward through the vanes, each of the plurality of vanes having an inside leading edge adjacent the hub, at least one of the inside leading edges having at least one sharply defined point for contacting lawn debris entrained in the flow of air approaching the impeller in a manner which tends to break apart or tear the lawn debris.

2. The centrifugal impeller set forth in claim 1 wherein the at least one point is oriented toward the hub and toward the direction of the incoming flow of air.

3. The centrifugal impeller set forth in claim 1 wherein the at least one point is oriented in the direction of rotation of the impeller and inwardly toward the hub.

4. The centrifugal impeller set forth in claim 1 wherein each inside leading edge of each of the plurality of vanes includes thereon at least one sharply-defined point.

5. The centrifugal impeller set forth in claim 4 wherein each of the at least one sharply-defined points on each of the plurality of vanes is oriented toward the hub and toward the direction of the incoming flow of air.

6. The centrifugal impeller set forth in claim 4 wherein each of the at least one sharply-defined points on each of the plurality of vanes is oriented in the direction of rotation of the impeller and inwardly toward the hub.

7. A lawn vacuuming apparatus for shredding debris comprising:

a motor mounted on a housing having an air inlet opening and an air outlet opening, the motor having a drive shaft passing through an opening in the housing;

a centrifugal impeller mounted to the drive shaft and disposed within the housing proximate the air inlet opening comprising:

a central hub for mounting the impeller to the drive shaft; and a plurality of vanes coupled to the central hub for creating a flow of air toward the hub and then radially outward through the vanes, each of the plurality of vanes having an inside leading edge adjacent the hub, at least one of the inside leading edges having at least one sharply defined point for contacting lawn debris entrained in the flow of air approaching the impeller for breaking apart or tearing the lawn debris.

8. The lawn vacuuming apparatus set forth in claim 7 wherein the at least one point is oriented toward the hub and toward the direction of the incoming flow of air.

9. The lawn vacuuming apparatus set forth in claim 7 wherein the at least one point is oriented in the direction of rotation of the impeller and inwardly toward the hub.

10. The lawn vacuuming apparatus set forth in claim 7 wherein each inside leading edge of each of the plurality of vanes includes thereon at least one sharply-defined point.

11. The lawn vacuuming apparatus set forth in claim 10 wherein each of the at least one sharply-defined points on each of the plurality of vanes is oriented toward the hub and toward the direction of the incoming flow of air.

12. The lawn vacuuming apparatus set forth in claim 10 wherein each of the at least one sharply-defined points on each of the plurality of vanes is oriented in the direction of rotation of the impeller and inwardly toward the hub.

13. The lawn vacuuming apparatus set forth in claim 7 wherein the apparatus is a held-held, portable vacuum having a handle for manually carrying the apparatus for operation in an elevated position.

14. The lawn vacuuming apparatus set forth in claim 13 wherein the motor is an electric motor.

15. A hand-held leaf blower-vacuum apparatus for shredding debris comprising:

a motor mounted on a housing having an air inlet opening and an air outlet opening, the motor having a drive shaft passing through an opening in the housing;

a handle connected to the housing for carrying and operating the apparatus in an elevated position;

a centrifugal impeller mounted to the drive shaft and disposed within the housing proximate the air inlet opening comprising:

a central hub for mounting the impeller to the drive shaft; and a plurality of vanes coupled to the central hub for creating a flow of air toward the hub and then radially outward through the vanes, each of the plurality of vanes having an inside leading edge adjacent the hub, at least one of the inside leading edges having at least one sharply defined point for contacting lawn debris entrained in the flow of air approaching the impeller for breaking apart or tearing the lawn debris.

16. The hand-held leaf blower-vacuum apparatus set forth in claim 15 wherein the at least one point is oriented toward the hub and toward the direction of the incoming flow of air.

17. The hand-held leaf blower-vacuum apparatus set forth in claim 15 wherein the at least one point is oriented in the direction of rotation of the impeller and inwardly toward the hub.

18. The hand-held leaf blower-vacuum apparatus set forth in claim 15 wherein each inside leading edge of each of the plurality of vanes includes thereon at least one sharply-defined point.

19. The hand-held leaf blower-vacuum apparatus set forth in claim 18 wherein each of the at least one sharply-defined points on each of the plurality of vanes is oriented toward the hub and toward the direction of the incoming flow of air.

20. The hand-held leaf blower-vacuum apparatus set forth in claim 18 wherein each of the at least one sharply-defined points on each of the plurality of vanes is oriented in the direction of rotation of the impeller and inwardly toward the hub.

21. The hand-held leaf blower-vacuum apparatus set forth in claim 15 wherein the motor is an electric motor.

* * * * *